(12) United States Patent
Enenkel

(10) Patent No.: US 8,172,498 B2
(45) Date of Patent: May 8, 2012

(54) DEVICE FOR UNLOADING A CONTAINER

(75) Inventor: Peter Enenkel, Constance (DE)

(73) Assignee: Siemens Akiengesellschaft, Munich (DE)

( * ) Notice: Subject to any disclaimer, the term of this patent is extended or adjusted under 35 U.S.C. 154(b) by 218 days.

(21) Appl. No.: 12/082,424

(22) Filed: Apr. 11, 2008

(65) Prior Publication Data
US 2008/0260506 A1    Oct. 23, 2008

(30) Foreign Application Priority Data
Apr. 19, 2007  (DE) .......... 10 2007 018 634

(51) Int. Cl.
*B65G 65/23*    (2006.01)
(52) U.S. Cl. ............... 414/416.01; 414/421; 414/790.5; 414/811
(58) Field of Classification Search ............ 414/416.01, 414/419, 421, 811, 766, 789.2, 790.5, 795.9
See application file for complete search history.

(56) References Cited

U.S. PATENT DOCUMENTS

| | | | |
|---|---|---|---|
| 4,744,715 A | 5/1988 | Kawabata | |
| 5,271,710 A | 12/1993 | Decharran et al. | |
| 5,772,383 A * | 6/1998 | Kalika et al. | 414/403 |
| 5,797,716 A * | 8/1998 | Herrin | 414/420 |
| 6,336,782 B1 * | 1/2002 | Pawlak et al. | 414/403 |
| 6,558,103 B2 * | 5/2003 | Lilley | 414/356 |
| 6,634,846 B1 | 10/2003 | Enenkel | |
| 7,572,094 B2 * | 8/2009 | Miskiewicz et al. | 414/758 |

FOREIGN PATENT DOCUMENTS

| | | |
|---|---|---|
| AU | 730535 B2 | 3/2001 |
| DE | 10211785 A1 | 10/2003 |
| EP | 0716891 A1 | 6/1996 |
| EP | 1437183 B1 | 7/2006 |
| WO | WO 98/23393 A1 | 6/1998 |

OTHER PUBLICATIONS

Derwent Abstract—WO 98/23393 A1; Jun. 4, 1998; Siemens Aktiengesellschaft, D-80333 Muenchen, Germany.
Derwent Abstract—EP 0 716 891 A1; Jun. 19, 1996; Danel-Ferry, société anonyme, F-92412 Courbevoie Cédex, France.

\* cited by examiner

*Primary Examiner* — James Keenan
(74) *Attorney, Agent, or Firm* — Laurence A. Greenberg; Werner H. Stemer; Ralph E. Locher

(57) ABSTRACT

A device for unloading a container having a removal opening has a rotatably mounted supporting surface mounted to turn around a first turning axis, a rotatably mounted retaining device, and a synchronizing device. The unloading device causes a container on the supporting surface to tilt so that the removal opening of the tilted container points obliquely or vertically downwards. The retaining device prevents an article inside the tilted container from moving linearly through the removal opening. The retaining device is mounted to turn around a second turning axis. The synchronizing device is configured for synchronizing turning of the supporting surface around the first turning axis and the retaining device around the second turning axis. The synchronized turning of the supporting surface and retaining device causes the container standing on the supporting surface to tilt such that the removal opening of the tilted container points obliquely or vertically downwards.

17 Claims, 13 Drawing Sheets

DEVICE FOR UNLOADING A CONTAINER

CROSS-REFERENCE TO RELATED APPLICATIONS

The present application claims priority to German application no. 10 2007 0018 634.9, filed Apr. 19, 2007, which is hereby incorporated by reference in its entirety.

BACKGROUND OF THE INVENTION

The invention relates to a device and method for unloading a container. For instance, while items of mail are being conveyed, the task arises of removing an article from an open-topped container. The article is, for example, a stack of mail items. The items are, say, standard-sized or large letters or possibly catalogs. The items of mail are prior to being removed located in an open-topped container into which they are placed after being brought in, for example. If removal is in an upward direction then the force of the items due to weight would need to be compensated by means of, for example, lateral limiting elements. It is, though, desired for the items of mail not to be damaged while being removed from the container, which is why the limiting elements must not exert too great a holding pressure.

U.S. Pat. No. 4,744,715 describes a device for unloading a container having a removal opening for removing an article. The article is in that case a "wafer". Prior to unloading, the article is located in the container of a type such that the article can be removed through the vertical removal opening. The container rests on a supporting surface which, being mounted on a driven hollow shaft, is mounted rotatably. The article is prior to being removed held in the container by two retaining elements. The retaining elements are mounted rotatably on a shaft ducted into the supporting surface's hollow shaft. The container is tilted through 90 degrees so that the removal opening points downwards. The retaining elements prevent the article from dropping out of the container. A further supporting element is moved into a position beneath the article. The retaining elements are both removed so that the article rests on the supporting element. The container is swiveled into its initial position.

WO 98/23393 A1 describes how a receptacle filled with postal items is emptied. The receptacle is prior to unloading positioned in such a way that the removal opening points upwards and postal items rest horizontally on two inclined faces in the receptacle. A pickup and transfer head is positioned above the receptacle. The head has an L-shaped component one of whose limbs is applied against the receptacle wall. Secured to the other limb are pressure pads that compress the stack. The head raises the receptacle and turns it. The receptacle can then be lifted off and the stack further processed.

DE 19905955 C1 describes a method and device for unloading an open-topped container containing postal items. Retainer supports between which the stack of postal items is clamped are moved into the open-topped container. The container is turned through more than 90 degrees, producing a gap between the stack and the then upward pointing container bottom. A moving stop wall prevents the postal items from dropping out of the container. A base plate is pushed into the gap, and the container is turned back. The stack, resting on the base plate, can be removed from the container.

EP 0716891 A1 discloses a device for lifting a stack of flat articles into a container. The stack is therein aligned then compressed by two limiting elements and lifted. A container is moved into a position beneath the lifted stack and the stack then lowered into the container. Those steps of the method can be performed also in reverse order.

EP 1437183 B1 describes a device having a support means for supporting the filled container. The support means is mounted rotatably. The container can be turned and the items of mail removed from the turned container.

SUMMARY OF THE INVENTION

The object of the invention is to provide a device and a method that provide for an article, in particular a stack of flat mail items, to be easier removed from an open-topped container.

Accordingly, one aspect involves a device having a rotatably mounted supporting surface, a likewise rotatably mounted retaining means, and a synchronizing means. The supporting surface and retaining means are mounted capable of turning around, respectively, a first turning axis and a second turning axis. The synchronizing means synchronizes turning of the supporting surface with turning of the retaining means. Synchronized turning of the supporting surface and retaining means causes a container, resting prior to turning on the supporting surface in such a way that the removal opening points upwards, to tilt. The tilted container's removal opening points after the tilting obliquely or vertically downwards. The retaining means is arranged such that prevents after synchronized turning an article inside the container from moving linearly through the removal opening.

The device and method enable containers present in any event to be used. The invention obviates having to provide special containers adapted to an unloading device.

The device and method do not require measuring either dimensions or the weight of an article in the container in order to remove the article therefrom. Further, the device and method allow a relatively simple mechanical structural design. The device and method obviate the need to remove an article from the container by exerting a holding pressure counter to the force due to weight. That would be disadvantageous in that the article could be damaged by the holding pressure.

The supporting surface and retaining means can be turned around two different turning axes. The retaining means can consequently be embodied such as to prevent the article from moving linearly in two different directions.

The retaining means preferably includes two limiting elements. These can be swiveled into an engaged position in which an article inside the container is located between them. The limiting elements are in that position applied against the article. The two limiting elements prevent the article from dropping out of the tilted container.

BRIEF DESCRIPTION OF THE SEVERAL VIEWS OF THE DRAWINGS

The novel features and method steps characteristic of the invention are set out in the claims below. The invention itself, however, as well as other features and advantages thereof, are best understood by reference to the detailed description, which follows, when read in conjunction with the accompanying drawings, wherein:

DETAILED DESCRIPTION OF THE DRAWINGS

The device is in the exemplary embodiment used for removing a stack St of flat mail items from a container B. The container B has a rectangular bottom, four side walls, and a rectangular removal opening. It is therefore open at the top. The container B is reused after unloading.

The items of mail are standing upright and mutually parallel in the container B. In each case one narrow side is standing on the container bottom. Neither the mail items nor the container B ought to be damaged by unloading.

Figure 1:
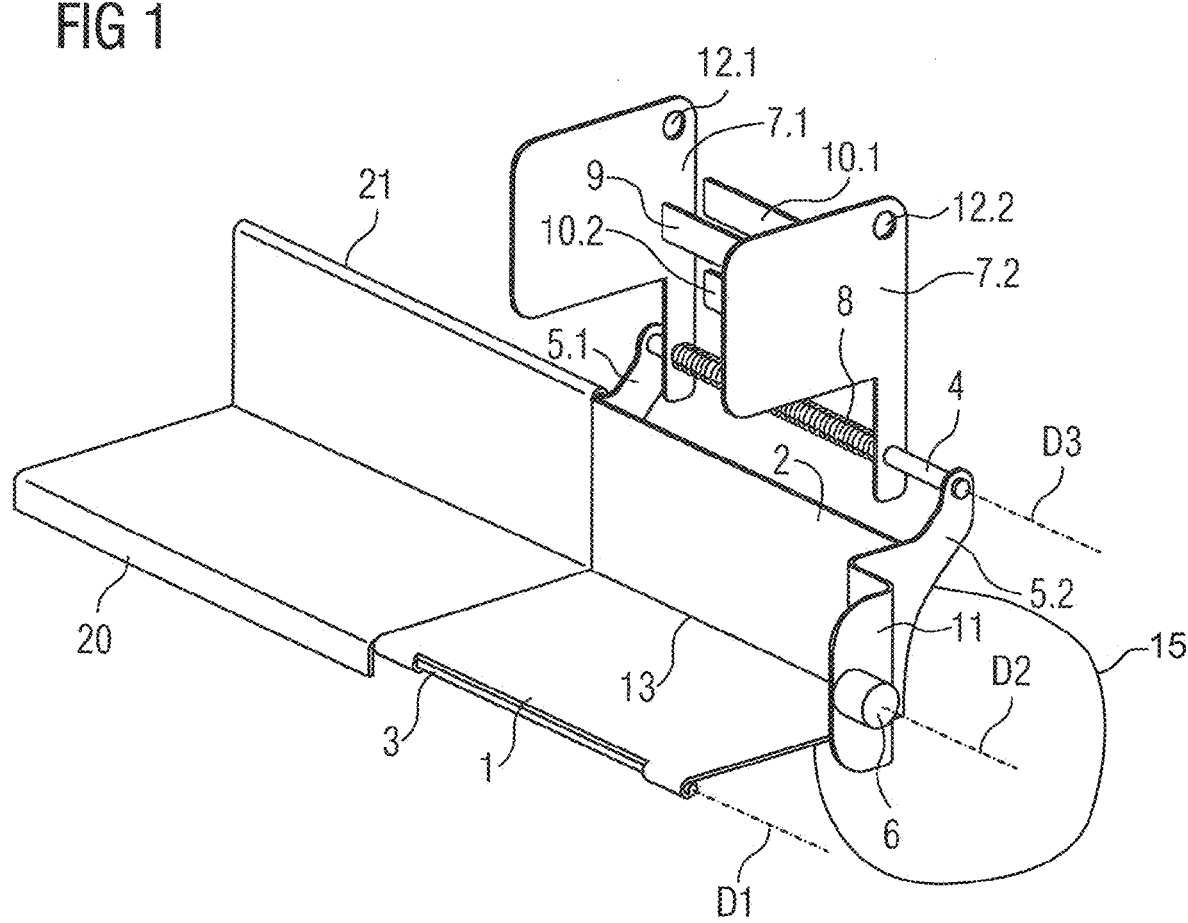
FIG. 1 shows the device in the initial position without a container.

FIG. 1 shows the device before unloading begins. The items of mail in the stack St are in the exemplary embodiment to be pushed onto two aligning surfaces 20, 21 of a jolting table. The jolting table causes the items of mail to become aligned along the two aligning surfaces 20, 21. The aligning is carried out so that a sorting system can perform the ensuing steps.

The device has a supporting means for the filled container B. The supporting means includes two supporting surfaces 1, 2. The supporting surface 1 is swivel-mounted in a securing means 3. The supporting surface 1 is in the exemplary embodiment linked to the securing means 3 in such a way that the supporting surface 1 can turn around a turning axis D1.

The supporting surface 2 is swivel-mounted. The supporting surface 2 is in the exemplary embodiment mounted capable of turning around a turning axis D2. The two turning axes D1, D2 are mutually parallel in the exemplary embodiment.

Two spacing elements connect the supporting surface 2 to a securing means. One spacing element 6 is shown in FIG. 1. The spacing element 6 is located between the supporting surface 2 and the securing means and is attached to, for example, a stop element 11.

The securing means 3 for the supporting surface 1 is indicated in the figures whereas the securing means for the supporting surface 2 is not shown.

The turning axis D2 preferably traverses the center of gravity of the laden container B or passes close by the center of gravity. The filled container B is thanks to that embodiment easy to turn around the turning axis D2 and with little force expended when positioned on the supporting surface 1 and bordering the supporting surface 2.

In one embodiment, the device further has a guiding device that guides swiveling of the supporting surface 2. The guiding device is not shown in the figures. Its shape is that of, for example, a curved guide rail. The supporting surface 2 has a projection. The projection corresponds with the guiding device. For example the projection is shaped like a pin and engages with the guide rail. The guiding device thereby stabilizes turning of the supporting surface 2 around the turning axis D2. The guiding device at the same time limits turning of the supporting surface 2.

Each supporting surface 1, 2 can be turned through an angle which in the exemplary embodiment is between 90 degrees and 130 degrees, specifically between a horizontal and approximately vertical position. The two supporting surfaces 1, 2 are mutually linked by a synchronizing device 15. The synchronizing device 15 mutually synchronizes turning of the two supporting surfaces 1, 2.

The synchronizing device 15 includes in one embodiment a spring that is applied against the securing means of the supporting surface 1 or against the guiding device of the supporting surface 2 and presses the supporting surface 1 against the edge 13. In another embodiment the synchronizing device 15 includes a joint mutually linking the two supporting surfaces 1, 2.

The device furthermore has two flat limiting elements 7.1, 7.2 ("paddles"). The limiting elements 7.1, 7.2 are secured in a manner capable of swiveling to a limiting-element securing means 4. The limiting element 7.1 has in the exemplary embodiment a rectangular, approximately square surface with rounded corners and a circular opening 12.1 as well as a spacing element. The limiting element 7.2 likewise has a rectangular, approximately square surface with rounded corners and a circular opening 12.2 as well as a spacing element. In the following figures, the openings 12.1, 12.2 elucidate turning of the limiting elements 7.1, 7.2.

The limiting-element securing means 4 is in the exemplary embodiment shaped like a shaft on which the two limiting elements 7.1, 7.2 are rotatably mounted. The two limiting elements 7.1, 7.2 and, hence, the retaining elements 9, 10.1, 10.2 can, owing to the mounting, be turned around a turning axis D3. The turning axis D3 is in the exemplary embodiment parallel to the two turning axes D1 and D2.

Two spacing elements 5.1, 5.2 link the limiting-element securing means 4 to the supporting surface 2. One spacing element 5.2 merges into the stop element 11 of the supporting surface 2. The two spacing elements 5.1, 5.2 and, hence, the limiting-element securing means 4 are co-turned when the supporting surface 2 is turned around the turning axis D2.

When the supporting surface 2 is turned around the turning axis D2 there is a slit, whose width preferably does not exceed a predefined value during turning, between the edge 13 opposite the spacing elements 5.1, 5.2 and the other supporting surface 1. The slit's width varies while the container B is being unloaded, but only within the predefined limits. A container B is thereby prevented from dropping out between the supporting surfaces 1, 2.

The limiting elements 7.1, 7.2 can be swiveled back and forth between an engaged position and a release position. In the engaged position the two limiting elements 7.1, 7.2 engage with a container B standing on one of the supporting surfaces, surface 1. In the release position a container B can be moved back and forth on the supporting surface 1 without being impeded in its movement by the limiting elements 7.1, 7.2.

The two limiting elements 7.1, 7.2 are in the exemplary embodiment secured rotatably on the limiting-element securing means 4 and are able to be moved into and out of the engaged position by being turned around the turning axis D3.

The spacing between the two limiting elements 7.1, 7.2 can be altered. The limiting elements can thus be accommodated to containers that are filled differently and to containers of different sizes.

A spring 8 pulls the two limiting elements 7.1, 7.2 together. That causes the two limiting elements 7.1, 7.2 in the engaged position to compress items of mail in the container B. The holding pressure is, though, sufficiently low for the compressing not to damage items of mail. The holding pressure exerted by the two limiting elements 7.1, 7.2 is furthermore not sufficiently great to compensate the force due to the mail items' weight. A holding pressure sufficient to do so could damage items of mail or cause them to mutually adhere or stick together and be difficult to separate.

A limiting element 7.2 is in the exemplary embodiment secured to the shaft 4 in such a way as to be unable to be moved parallel to the turning axis D3. The spring 8 is applied against the limiting element 7.2. The other limiting element 7.1 can be moved parallel to the turning axis D3. The spring 8 is linked to the other limiting element 7.1.

Instead of the spring 8 it is possible also to use, for example, a cylinder in which a piston slides back and forth. The piston and a plurality of inner walls of the cylinder form a closed chamber filled with a gas.

At least one of the limiting elements 7.1, 7.2 has at least one retaining element extending up to the other limiting element. The retaining element is linked rigidly to the limiting element and stands preferably perpendicular on the limiting element's surface. The limiting element 7.1 has in the exemplary embodiment a longer retaining element 9 linked rigidly to the limiting element 7.1. Two shorter retaining elements 10.1, 10.2 are linked rigidly to the limiting element 7.2.

The retaining element 9 stands perpendicular on the surface of the limiting element 7.1, and the two retaining elements 10.1, 10.2 stand perpendicular on the surface of the retaining element 7.2.

In the release position, the spring 8 causes the retaining element 9 of one of the limiting elements, element 7.1, to strike against the other limiting element 7.2. That will not happen in the engaged position unless there are so many items of mail between the two limiting elements 7.1 and 7.2 that the overall thickness of the items exceeds the length of the retaining element 9.

It is described below how items of mail are removed from the container B with the aid of the inventive device.

An operator moves the device into a position in which the two limiting elements 7.1, 7.2 are in the release position and the two supporting surfaces 1, 2 are standing mutually perpendicular one on the other, specifically such that the supporting surface 1 is horizontal and the supporting surface 2 vertical. FIG. 1 shows the initial position.

Figure 2:
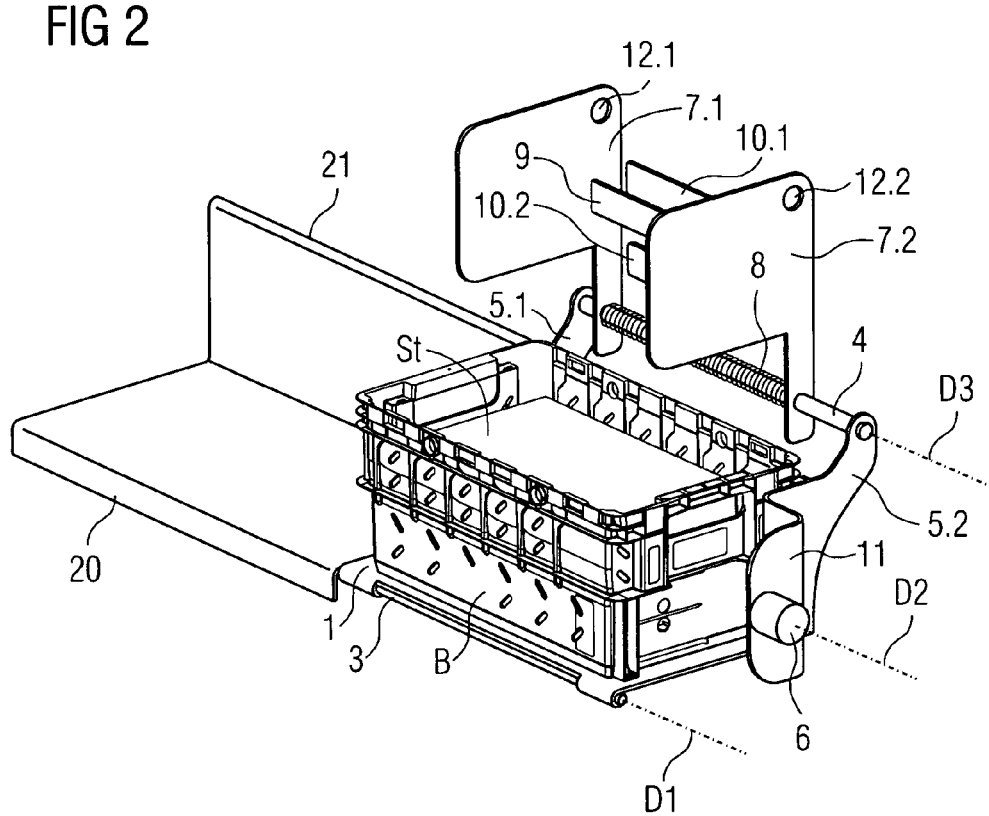
FIG. 2 shows the device in the initial position with a container.

The operator—or an automatic operating device—places the laden container B onto the supporting surface 1, which in the initial position is horizontal, and pushes the container B towards the now vertical supporting surface 2. The operator preferably continues pushing the container B up to the stop element 11. FIG. 2 shows the device with the laden container B on the supporting surface 1.

The container B is in one embodiment—not shown in the figures—temporarily secured in a certain position relative to the supporting surfaces 1, 2. For example at least one supporting surface has an arched section that fits around the top edge of a side wall of the container B. Or the container B has a snap lock that engages with an opening in the container B or fits around a projection thereon.

The operator—or automatic device—first swivels the limiting element 7.1 into the engaged position by turning it around the turning axis D3. The limiting element 7.1 can be moved along the turning axis D3. If needed, the operator—or automatic device—moves the limiting element 7.1 parallel to the turning axis D3 specifically in such a way that the limiting element 7.1 engages with the container B between a transverse wall thereof and the stack St.

Figure 3:
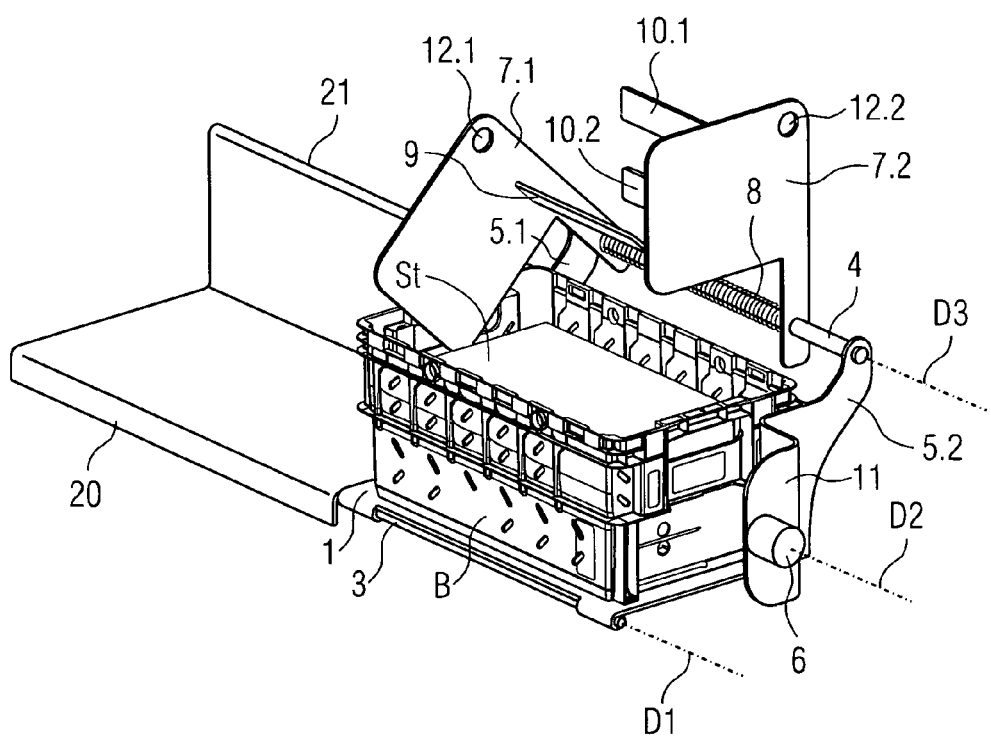
FIG. 3 shows the device with one limiting element half lowered.
Figure 4:
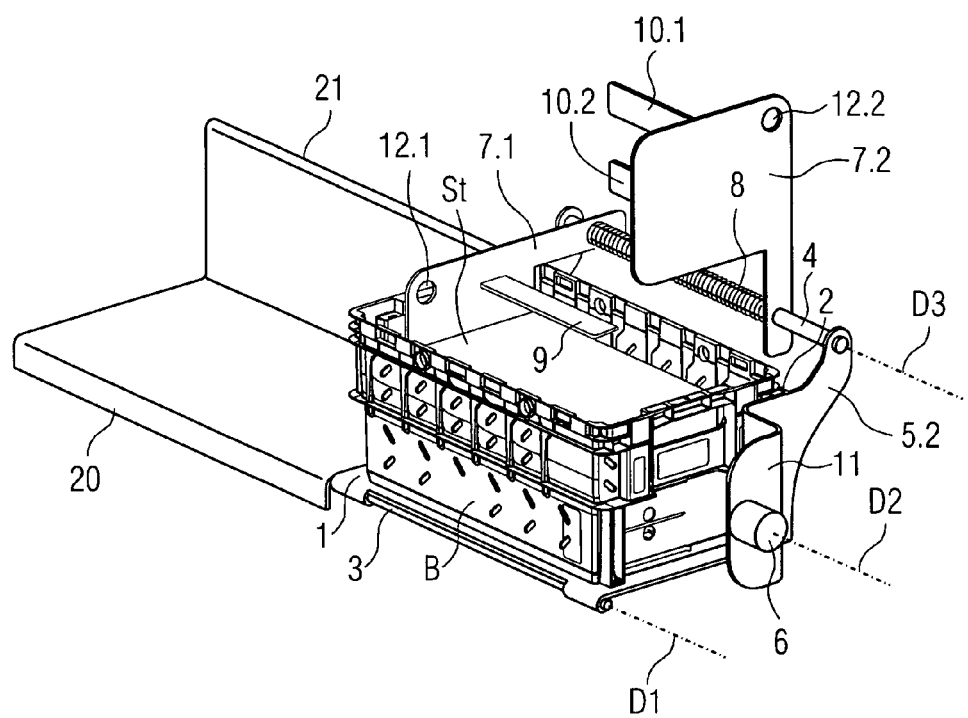
FIG. 4 shows the device with one limiting element fully lowered.

FIG. 3 shows the device with one limiting element 7.1 half lowered. FIG. 4 shows the device with one limiting element 7.1 fully lowered. The limiting element 7.1 is inserted between a transverse wall of the container B and the stack St. The other limiting element 7.2 is in both FIG. 3 and FIG. 4 still in the release position. The supporting surface 2 is concealed behind the container B.

Figure 5:
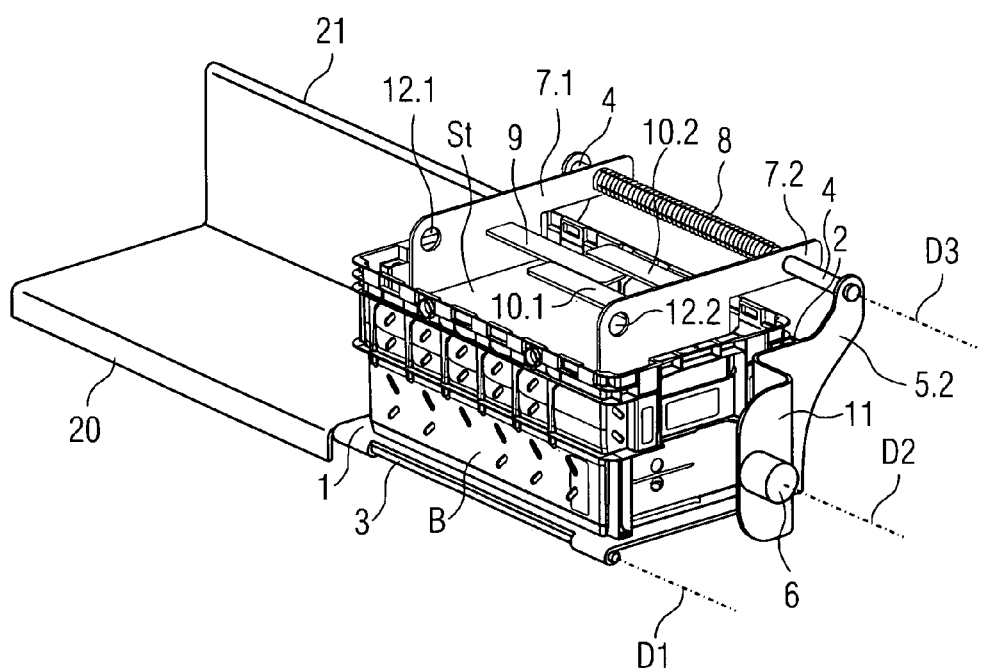
FIG. 5 shows the device with both limiting elements fully lowered and hence in the engaged position.

The operator then also turns the other limiting element 7.2 around the turning axis D3. FIG. 5 shows the device with both limiting elements 7.1, 7.2 in the engaged position. The limiting elements 7.1, 7.2 are arrested in the engaged position.

The operator then initiates synchronized turning of the two supporting surfaces 1 and 2, for example, by pressing a button. A drive means in the form of a spring or piston turns the two supporting surfaces 1, 2. The supporting surface 1 therein turns around the turning axis D1 and the supporting surface 2 turns around the turning axis D2. The synchronizing device 15 ensures that the two supporting surfaces 1, 2 turn around their respective turning axis with the same angular velocity.

The two limiting elements 7.1, 7.2 in the engaged position and, hence, also the retaining elements 9, 10.1, 10.2 turn, along with the supporting surface 2, around the second turning axis D2 and do not change their position relative to the supporting surface 2. The supporting surface 21, the two limiting elements 7.1, 7.2, and the retaining elements 9, 10.1, 10.2 belong in the exemplary embodiment to the retaining means.

The synchronizing device 15, the spacing elements 5.1, 5.2, and the securing means 4 for the limiting elements 7.1, 7.2 act jointly as the synchronizing means that synchronizes turning of the supporting surface 1 around the turning axis D1 with turning of the retaining elements 9, 10.1, 10.2, limiting elements 7.1, 7.2, and supporting surface 2 around the turning axis D2.

Figure 6:
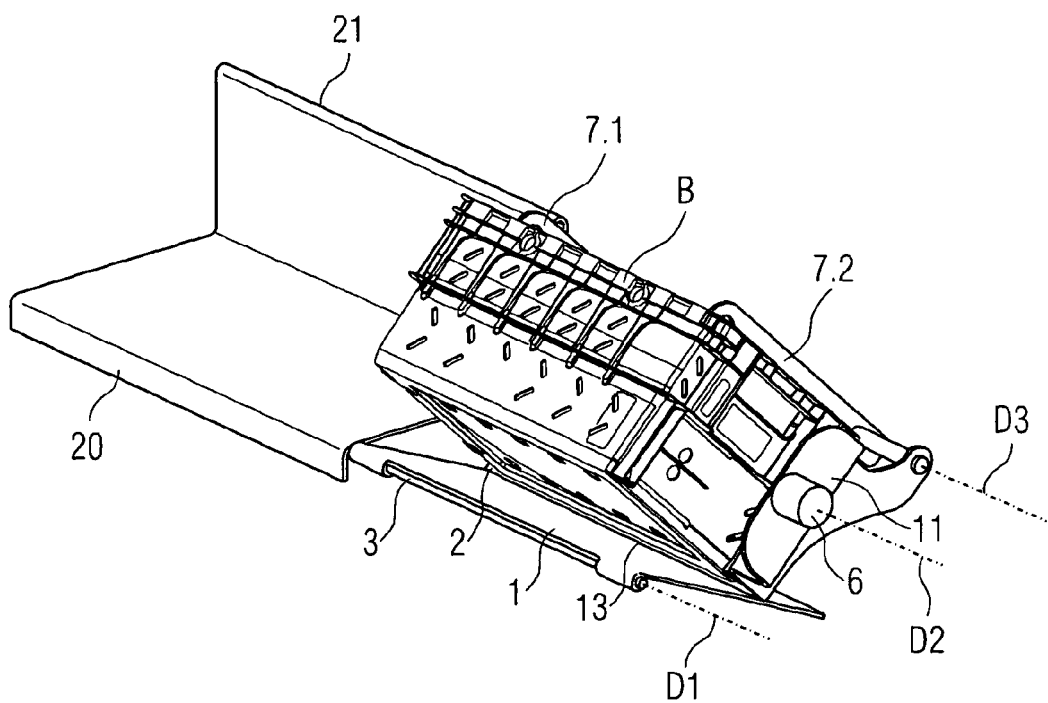
FIG. 6 shows the device while the supporting surfaces are turning.
Figure 7:
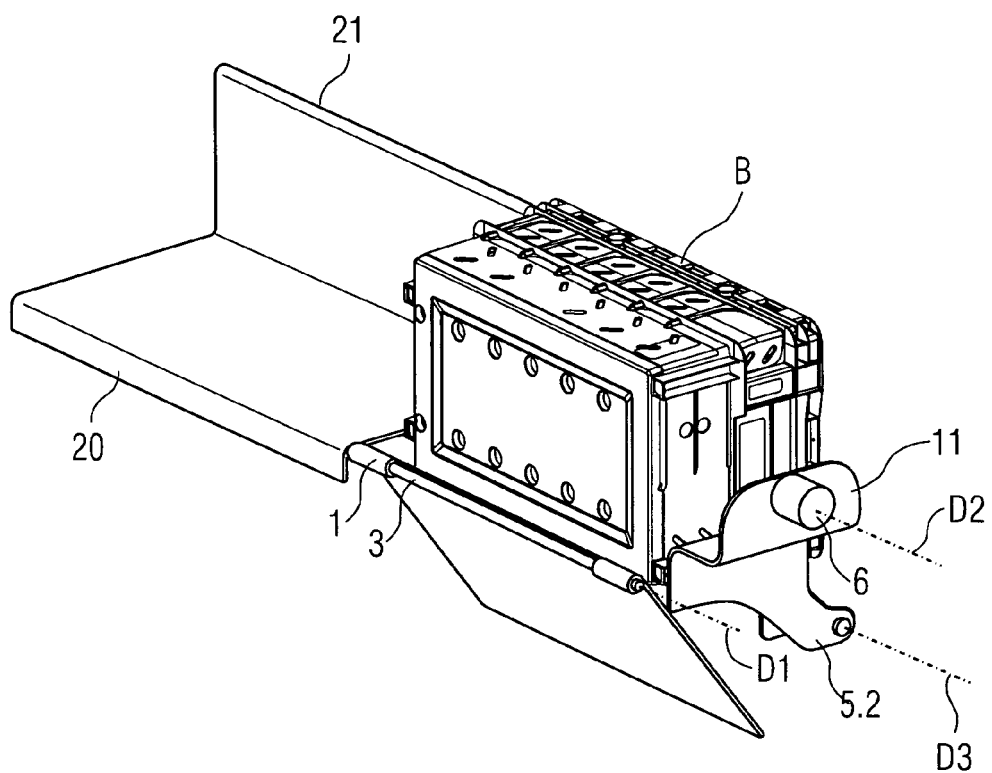
FIG. 7 shows the device while the supporting surfaces continue turning.

FIG. 6 shows the device while the supporting surfaces 1, 2 are turning around the turning axes D1 and D2. FIG. 7 shows their continued turning. Synchronized turning of the two supporting surfaces 1, 2 and retaining elements 9, 10.1, 10.2 causes the filled container B to tilt.

Figure 8:
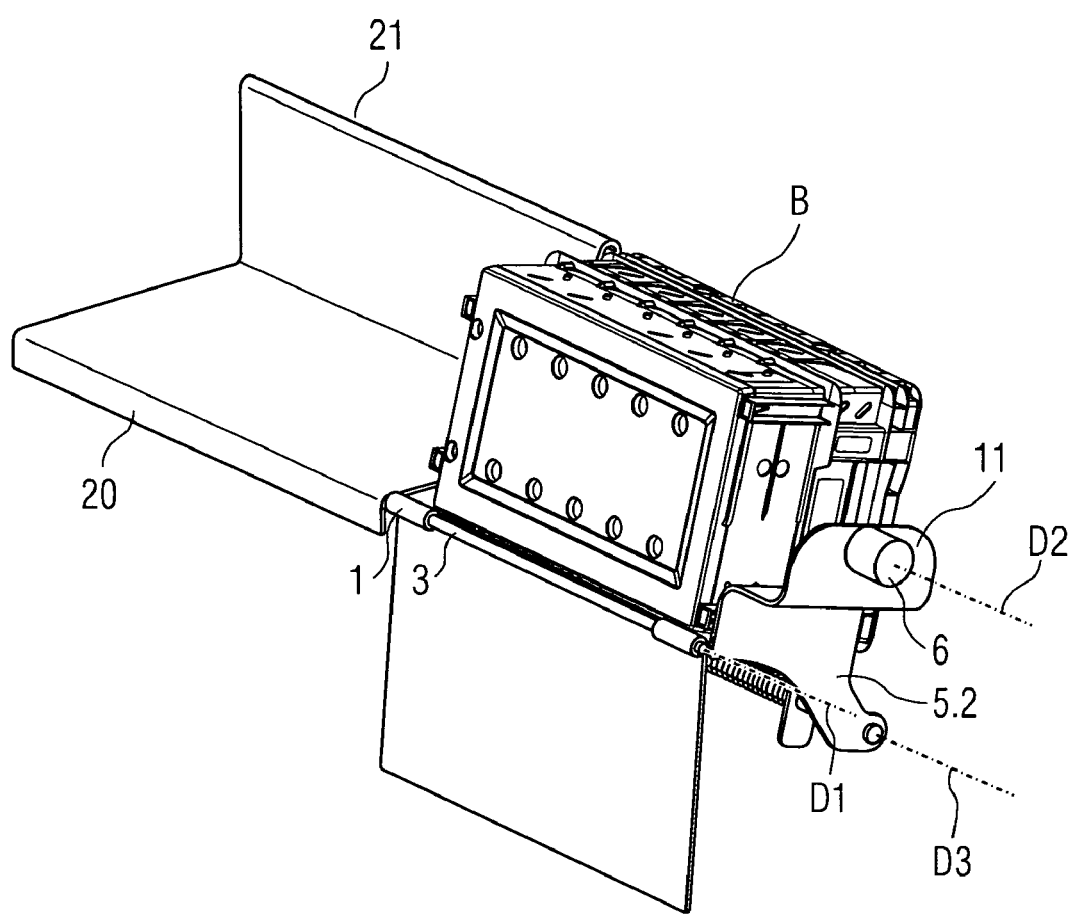
FIG. 8 shows the device in a situation in which only the back supporting surface is turned.

In FIG. 8, the device is shown in a situation in which the supporting surface 1 has finished turning around the turning axis D1. The supporting surface 2 continues being turned through a small angle (less than 10 degrees) around the turning axis D2. The two turning axes D1 and D3 lie one above the other in the viewing direction employed for FIG. 8.

The removal opening of the container B points obliquely downwards, its bottom obliquely upwards. The weight of the stack St rests partially on the retaining elements 9, 10.1, 10.2.

Figure 9:
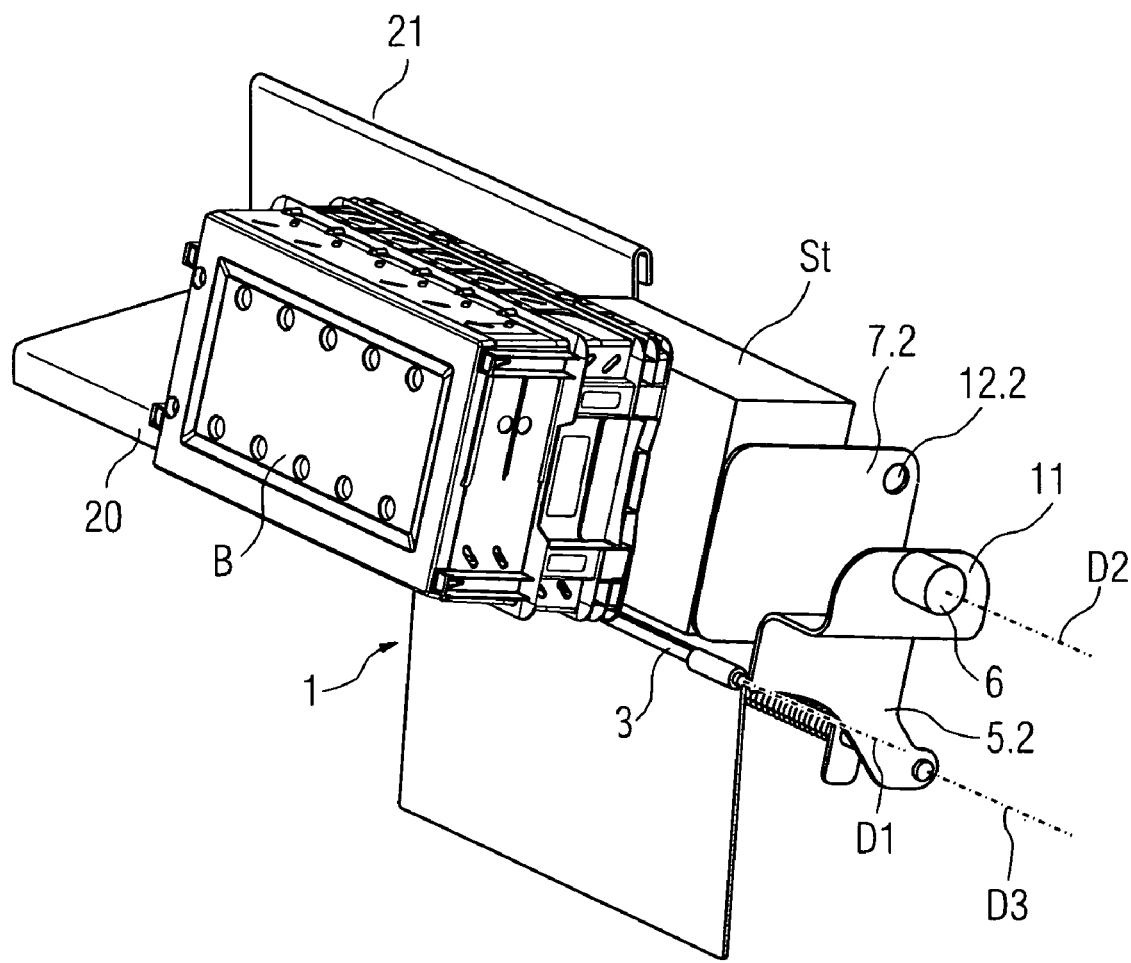
FIG. 9 shows the device in the same situation as shown in FIG. 8 but with the container pulled away.

The container B can now easily be pulled to the side. The two limiting elements 7.1, 7.2 prevent the stack St from being pulled away at the same time. In FIG. 9, the device is shown with the container B pulled away. The container B can still be seen.

The operator—or automatic operating device—initiates further turning of the two supporting surfaces 1, 2 when the container B has been pulled away completely. The supporting surface 1 is again turned around the turning axis D1 and the supporting surface 2 is again turned around the turning axis D2. Both supporting surfaces 1, 2 are now turned in a turning direction opposite that during turning with the container B attached. The stack St therein lies on the supporting surface 2.

Figure 10:
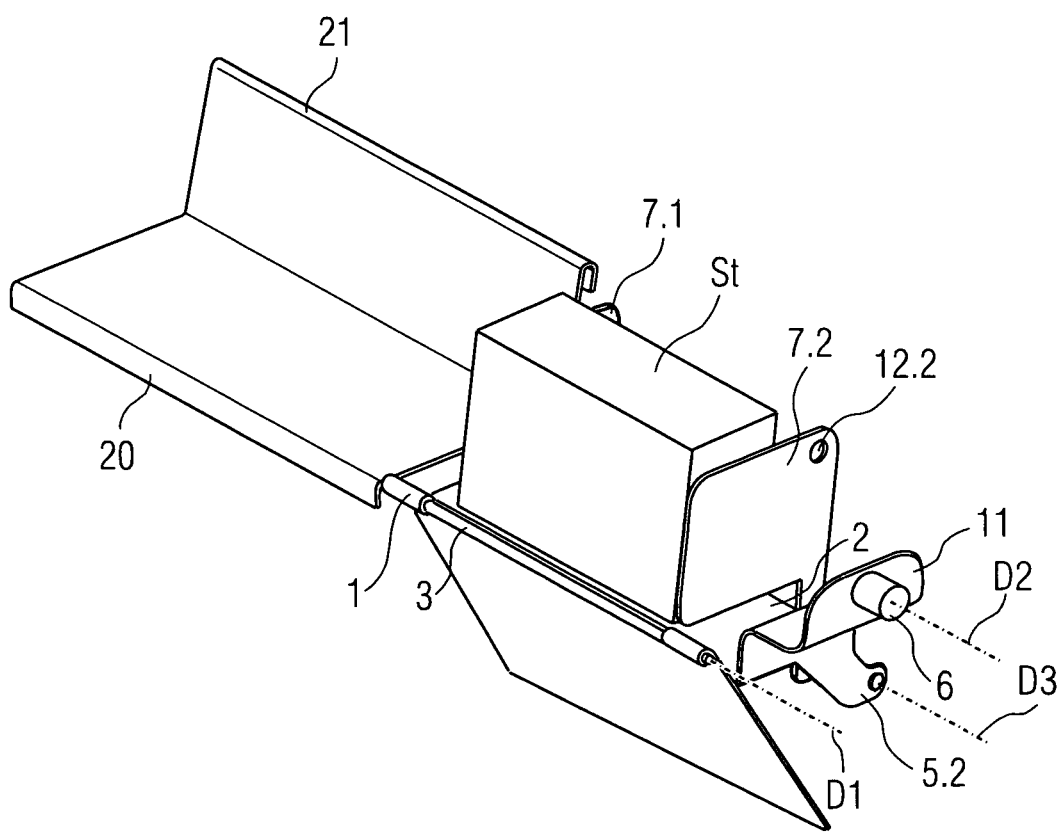
FIG. 10 shows the device with the container completely removed while the supporting surfaces are being turned back.
Figure 11:
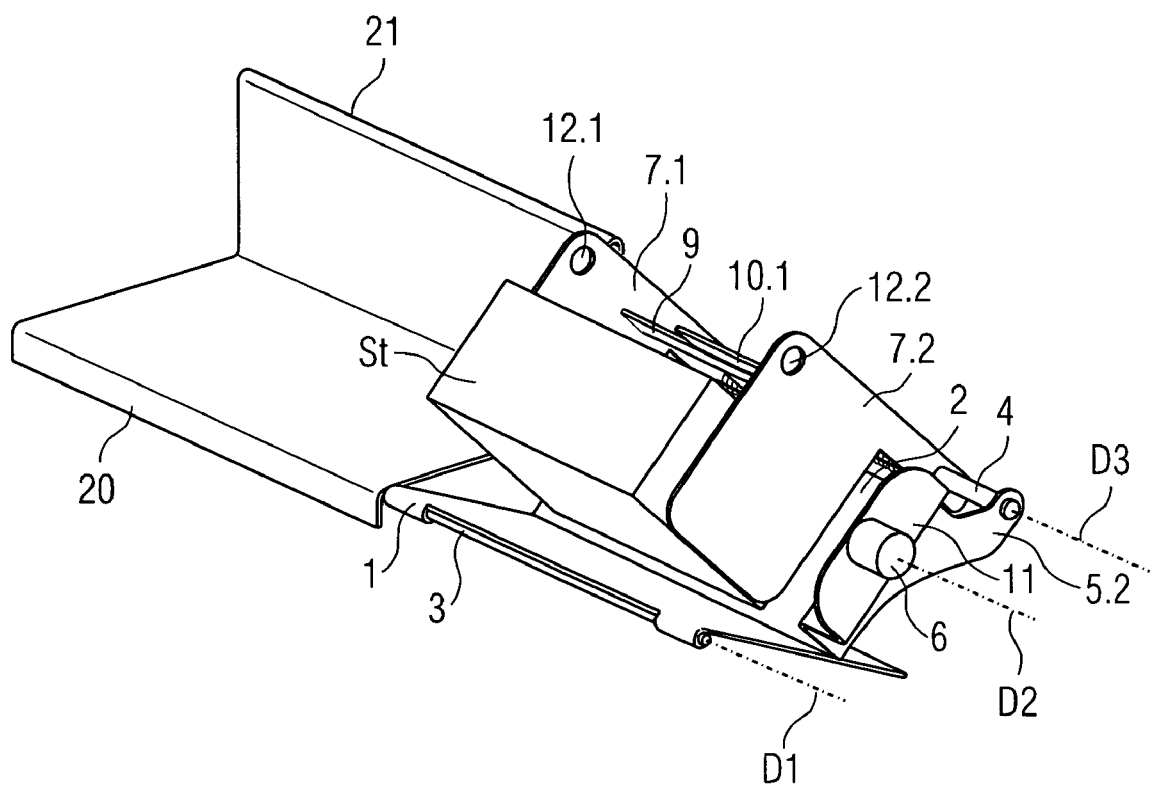
FIG. 11 shows the device after turning-back shown in FIG. 10 has continued.

FIG. 10 shows the device with the container B completely removed while the supporting surfaces are being turned back. FIG. 11 shows the device after turning-back has continued. The retaining elements 9, 10.1, 10.2 prevent the stack St from sliding away laterally.

Figure 12:
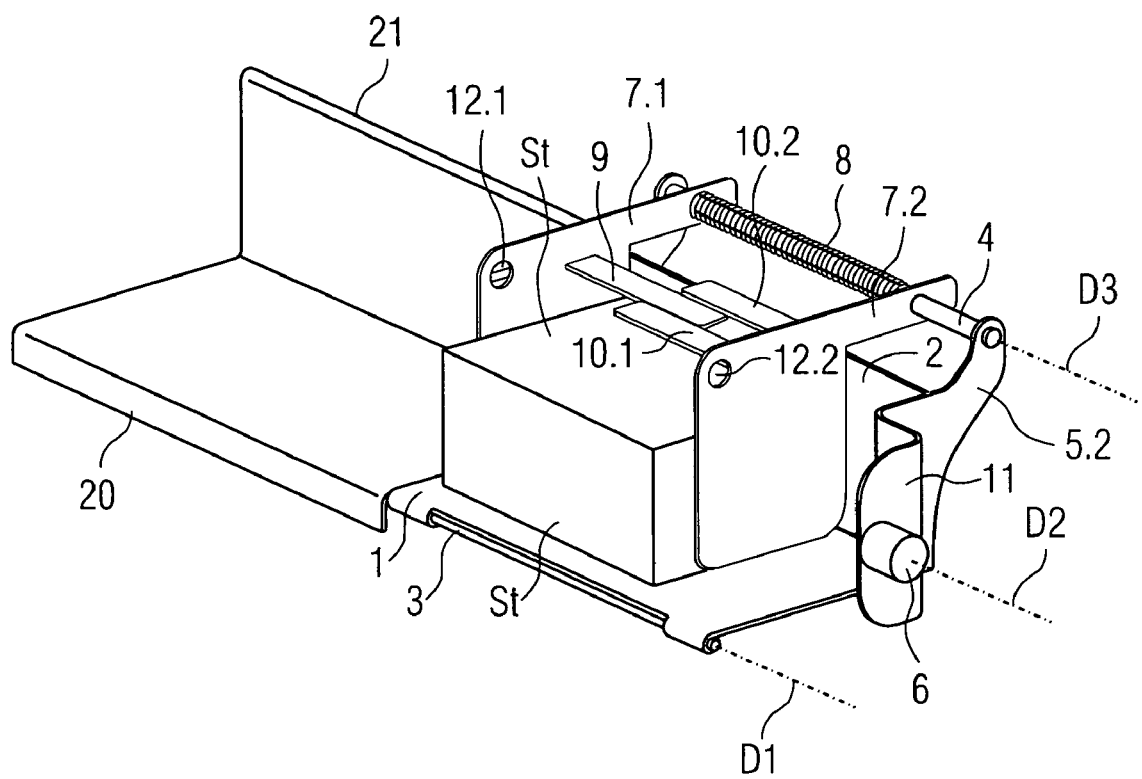
FIG. 12 shows the device when both supporting surfaces have finished being turned back.

Turning-back is finished once the supporting surface 1 has returned to a horizontal position and the supporting surface 2 has returned to a vertical position. FIG. 12 shows the device when the turning-back has finished.

Figure 13:
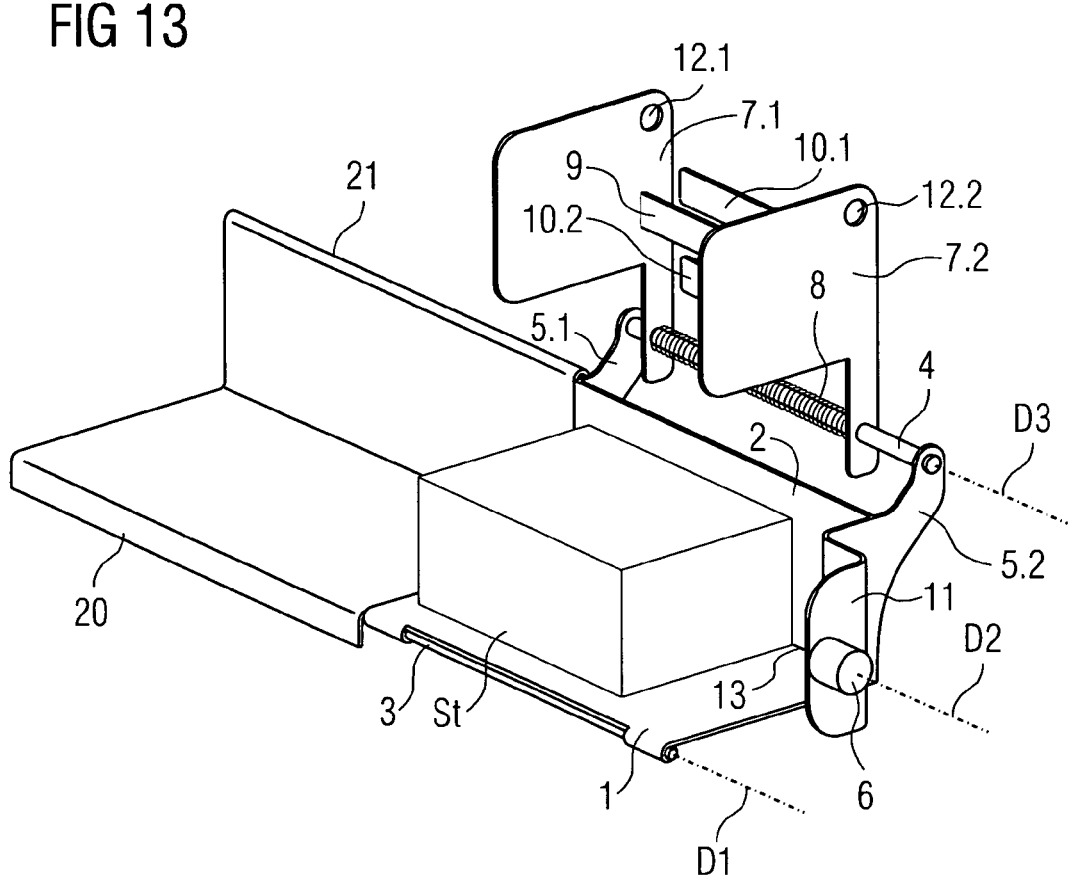
FIG. 13 shows the device with the limiting elements in the release position.

The limiting elements 7.1, 7.2 were throughout turning-back in the engaged position. With turning-back having finished, the operator or automatic device swivels the limiting elements 7.1, 7.2 from the engaged position into the release position. FIG. 13 shows the device with the limiting elements 7.1, 7.2 in the release position.

The stack St of mail items can then be removed. The stack St is in the exemplary embodiment pushed onto the two aligning surfaces 20, 21 of the jolting table.

What is claimed is:

1. A device for unloading a container having a removal opening for removing an article from the container, comprising:
   a rotatably mounted supporting surface for supporting a container, said supporting surface being mounted to turn around a first turning axis to thereby cause a container on the supporting surface to tilt so that the removal opening of the tilted container points obliquely or vertically downwards;
   rotatably mounted retaining means arranged to prevent an article inside the tilted container from moving linearly through the removal opening, the retaining means mounted to turn around a second turning axis different from the first turning axis; and
   synchronizing means configured for synchronizing a turning of the supporting surface around the first turning axis and a turning of the retaining means around the second turning axis with a temporal overlap, the synchronized turning of the supporting surface and the retaining means causing the container standing on the supporting surface before being tilted with the removal opening pointing upwards, to tilt such that the removal opening of the tilted container points obliquely or vertically downwards.

2. The device of claim 1, wherein the retaining means include a further supporting surface configured to support the container after turning.

3. The device of claim 2, wherein the further supporting surface is configured to be perpendicular to the supporting surface prior to synchronized turning.

4. The device of claim 1, wherein the retaining means are configured so that the second turning axis passes through a center of gravity of the container laden with an article.

5. The device of claim 1, wherein the supporting surface is configured to turn during synchronized turning through an angle between 90 degrees and 130 degrees.

6. The device of claim 1, wherein the two turning axes are mutually parallel.

7. The device of claim 1, wherein the retaining means have at least one retaining element, and the at least one retaining element is configured to swivel into an engaged position in which it prevents an article inside the container from moving linearly through the removal opening.

8. The device of claim 1, wherein the retaining means include two limiting elements configured to be swiveled into an engaged position in which an article inside the container is positioned between the two limiting elements and the limiting elements are applied against the article.

9. The device of claim 8, wherein each of the two limiting elements extends in a plane, and is arranged in such a way that the plane is perpendicular to the second turning axis.

10. The device of claim 8, wherein the two limiting elements are mounted to turn around a third turning axis, and configured to be swiveled into the engaged position through turning around the third turning axis.

11. The device of claim 8, wherein the two limiting elements are configured to be arrested in the engaged position.

12. The device of claim 8, wherein the two limiting elements are mounted to have an alterable mutual spacing.

13. The device of claim 8, wherein the retaining means include two retaining elements, each retaining element is configured to be swiveled into an engaged position, in which it prevents an article inside the container from moving linearly through the removal opening, and each retaining element is linked rigidly to in each case one of the limiting elements.

14. The device of claim 8, wherein the retaining means include a further supporting surface, which after turning supports the container, and the two limiting elements are linked rotatably to the further supporting surface.

15. A method for unloading a container having a removal opening, comprising:
   placing a container containing an article onto a supporting surface in such a way that the removal opening points upwards;
   turning the supporting surface and the container supported thereon around a first turning axis;
   turning retaining means around a second turning axis different from the first turning axis, and thereby synchronizing the turning of the supporting surface and the turning of the retaining means with a temporal overlap;
   causing the container to tilt such that after tilting the removal opening points obliquely or vertically downwards and the retaining means prevent the article inside the container from moving linearly through the removal opening and the synchronized turning of the supporting surface and retaining means causes the container to tilt; and
   removing the tilted container through moving of the container relative to the retaining means.

16. The method of claim 15, wherein the synchronized turning is executed in such a way that the container is turned around the second turning axis and through an angle between 90 degrees and 130 degrees.

17. The method of claim 15, wherein the retaining means include two limiting elements, and after the container has been placed onto the supporting surface and prior to the synchronized turning, the two limiting elements are moved into an engaged position in which the article is positioned between the limiting elements, both limiting elements are applied against the article, and the limiting elements are turned in synchronized manner around the second turning axis when the retaining means are turned.

* * * * *